United States Patent Office 2,910,404
Patented Oct. 27, 1959

2,910,404

PREPARATION OF OXYTOCIN AND ACTH

Bernard J. Baltes, Chicago, and Sanford L. Steelman, Elmhurst, Ill., assignors to Armour and Company, Chicago, Ill., a corporation of Illinois No Drawing. Application March 26, 1953
Serial No. 344,902

3 Claims. (Cl. 167—74)

This invention relates to the prepartion of oxytocin. More particularly, this invention relates to a method for preparing both oxytocin and adrenocorticotropin (ACTH) from the same batch of pituitary material. The method of this invention is particularly adapted to the preparation of oxytocin substantially free of vasopressin from hog pituitary material.

Oxytocin is a hormone produced by the posterior lobe of the pituitary gland. Vasopressin is another hormone produced by the posterior lobe. ACTH and other hormones are produced by the anterior lobe.

Both oxytocin and vasopressin are regarded as undesirable contaminants in ACTH preparations, and therefore an effort is made to produce ACTH free of oxytocin and vasopressin. One possible method of achieving this result is to separate the ACTH-containing anterior lobe from the oxytocin and vasopressin-containing posterior lobe prior to the extraction of the ACTH. However, this approach is not feasible on a commercial scale, and therefore it is necessary to extract the ACTH from pituitary material containing the hormones of both the anterior and posterior lobes.

Oxytocin and vasopressin, particularly oxytocin, are desired hormone products. Heretofore, no satisfactory method has been known for the recovery of both ACTH and oxytocin or vasopressin from the same batch of pituitary material. This presents a particularly acute problem, since the supply of pituitary glands is very limited. This is particularly true in the case of hog pituitary glands, which are rich in both ACTH and oxytocin. However, because of the great medical importance of ACTH, the production of this hormone requires substantially all of the available hog pituitary glands, which means that the potential recovery of oxytocin from this source is sacrificed for the recovery of the more important ACTH.

It is therefore the principal object of this invention to provide a method for recovering both ACTH and oxytocin from the same batch of pituitary material. Another object is to provide a method for recovering ACTH, oxytocin and vasopressin from the same batch of pituitary material. Still another object is to provide a method for preparing oxytocin substantially free of vasopressin, while at the same time preparing ACTH. Further objects and advantages will appear as the specification proceeds.

The starting material for use in the process of this invention is ACTH and oxytocin-bearing pituitary material, or more broadly, pituitary material containing the hormones from both the posterior and anterior lobes. Whole pituitary glands, either fresh or desiccated, can be satisfactorily employed. It is preferred that the pituitary material be in subdivided condition to facilitate the extraction.

The pituitary material is extracted with acidified aqueous acetone to obtain an extract containing adrenocorticotropin (ACTH), oxytocin, and vasopressin. The extracting solvent consists of a mixture of acetone and water containing from 50 to 85% acetone by volume, and preferably, from 65 to 82% acetone by volume. This mixture is acidified to a pH below 4 and, preferably, to a pH from 1 to 2. Various acids can be used for the acidification, such as the strong mineral acids. By way of specific example, the extraction can be carried out with 80% acetone at a pH of around 1.5 with hydrochloric acid used as the acidifying reagent.

The residue or insoluble fraction is separated from the extract which is then further processed to obtain the extracted hormones. This separation is preferably carried out by centrifugation, although other liquid-solids separating procedures can be used.

The acetone concentration of the extract is then increased to precipitate the ACTH. Usually the precipitation of ACTH can be brought about by adjusting the acetone concentration of the extract to within the range of from 86 to 95% by volume. The preferred acetone concentration for this precipitation step is from about 90 to 92% by volume.

The precipitate, comprising a crude ACTH preparation, is separated from the supernatant by filtration or other suitable procedure. The crude ACTH preparation thus obtained can be further purified in various ways according to procedures well known in the art.

This invention is based in part on the discovery that the supernatant which is separated from the ACTH precipitate in the manner described above, provides an excellent source of oxytocin and vasopressin. It has been further discovered that when hog pituitary material is employed as a starting material, that oxytocin substantially free from vasopressin can be prepared from the supernatant in the manner subsequently to be described in detail. These discoveries are believed to be unexpected, since in spite of the commercial value of oxytocin, no effort has heretofore been made to prepare both oxytocin and ACTH by the method of this invention.

During the experimental work leading to the present invention, it was discovered that a relatively concentrated aqueous solution of oxytocin, from which the oxytocin could be recovered, can be prepared by subjecting the supernatant obtained in the manner described above to distillation under reduced pressure to remove the bulk of the acetone. In other words, the supernatant, consisting of a mixture of water and from 86 to 95% by volume of acetone, is heated in a still which is maintained at subatmospheric pressure to distill off the acetone. Preferably, the distillation is continued until the concentration of acetone is reduced to less than 5% by volume. The residue of the distillation will be a concentrated aqueous solution of oxytocin and vasopressin. However, when hog pituitary material has been employed for the initial extraction, the aqueous residue will contain much more oxytocin than vasopressin.

Oxytocin and vasopressin preparations can then be prepared from the concentrated aqueous solution according to procedures well known in the art. Preferably, however, the oxytocin is extracted with butanol at a pH at which the extraction of vasopressin is suppressed. pHs from 2 to 4.5 are suitable, and best results are achieved at pHs within the range of from 3.0 to 4.0. Usually, it will be necessary to adjust the pH of the aqueous solution prior to the butanol extraction, since it will ordinarily be at a pH of from 1 to 2. This upward pH adjustment can be made with various alkaline reagents such as sodium and potassium hydroxide. Normal butanol or any isomer thereof can be used for the liquid-liquid extraction. Preferably, the butanol is brought into countercurrent contact with the aqueous solution of oxytocin and vasopressin. For example, the aqueous solution can be partitioned against butanol in a Podbielniak apparatus. The oxytocin will be extracted into the butanol phase, while the vasopressin will remain in the water phase. The butanol and water phases can then be separated, for example, by decanting, and each phase further processed to recover respectively the oxytocin and vasopressin.

The oxytocin can be recovered from the butanol phase by extracting it with aqueous acetic acid. For example, the oxytocin-containing butanol can be partitioned against 0.25% acetic acid in a countercurrent contact apparatus such as a Podbielniak. This effects the transfer of the oxytocin to the acidified aqueous phase, which can then be separated from the spent butanol phase. If desired, the butanol phase can be prepared for the aqueous acetic acid extraction by washing it with a suitable buffer solution until it is neutralized, and then drying it with a suitable drying agent. It has been found that somewhat better results are obtained when these additional steps are employed.

The aqueous acetic acid solution of oxytocin obtained in this manner can be used without further processing. However, if desired, additional purifying steps can be employed, and in any case it is desirable to sterilize the product. For example, sterilization can be effected by passing the solution through a Seitz filter. After being Seitz-filtered, the solution can be packaged in vials.

This invention is further illustrated by the following examples.

*Example I*

The preferred general procedure for preparing both ACTH and oxytocin from the same batch of pituitary material involves the following steps:

(1) Extract ACTH and oxytocin-bearing pituitary material with 70 to 80% acetone at a pH of from 1 to 2.
(2) Separate the extract from the insoluble residue.
(3) Precipitate ACTH from the extract by adjusting the acetone concentration of the extract to 90 to 92%.
(4) Separate the ACTH precipitate.
(5) Remove the acetone from the supernatant by distilling the supernatant in a vacuum until the concentration of acetone in the distilled residue is reduced to below 5%.
(6) Adjust the pH of the concentrated aqueous solution thus obtained to 3.5 with 5 N NaOH.
(7) Partition this solution against peroxide-free butanol.
(8) Separate the butanol from the aqueous phase, and wash the butanol phase with a 2 M phosphate buffer solution until neutralized.
(9) Dry the butanol phase over anhydrous sodium sulfate.
(10) Partition the dried butanol against 0.25% acetic acid.
(11) Separate the acetic acid phase from the butanol phase.
(12) Seitz-filter the aqueous acetic acid phase and package it in vials, thus obtaining an oxytocin product of high potency which is substantially free of vasopressin.

*Example II*

22.5 kgm. of fresh whole frozen hog pituitaries was ground for 4 hours with 17 kgm. of Dry Ice. The ground material was thawed for 10 minutes with steam. 22.5 liters of distilled water, 43.8 liters acetone and 1.735 liters concentrated HCl were added to the thawed tissue. The resulting pH was 1.49 and the solution was approximately 65% acetone. The material was extracted at 24° C. for 2 hours while being agitated with a stirrer. The solids were centrifuged off and 74 liters of clear dark solution was recovered. The tissue was re-extracted with a solution containing 8.9 liters of water, 31.8 liters of acetone and 176 cc. concentrated HCl. This mixture had a pH of 1.58 and an acetone concentration of 78%. The material was extracted the same way as the previous time but for 1½ hours. 29 liters of clear light solution was obtained from centrifugation.

To the combined supernatants totalling 103 liters, 228 liters of acetone was added. This increased the actone concentration to 92% and the precipiate was allowed to settle for 36 hours at 5°C. The solids were filtered off and 331 liters of supernatant was recovered. The acetone was removed under vaco in a circulating still while the temperature was maintained below 35°C. The remaining aqueous extract amounting to 28 liters is known as posterior pituitary concentrate (hog), and contains both oxytocin and vasopressin.

The posterior pituitary concentrate contained 1,800,000 USP units oxytocin and 448,000 units vasopressin. This solution was adjusted to pH 3.5 with 5 N NaOH and then partitioned against an equal volume of peroxide-free butyl alcohol in the Podbielniak centrifugal extractor (Model–5000). The alcohol fraction was washed with 1 part buffer to 2 parts butanol. The buffer consisted of 379 ml. 2 M $NaH_2PO_4$ plus 621 ml. 2 M $K_2HPO_4$ and had a pH of 6.9 The buffer can be reused until it loses its capacity. The alcohol was dried with anhydrous sodium sulfate, approximately 150 gms/liter solution. The dried butanol was partitioned against an equal volume of 0.25% acetic acid in the Podbielniak.

The aqueous phase was found to contain 1,000,000 USP units oxytocin and 37,000 units vasopressin. The volume was reduced to approximately 4 litters in the Majonnier keeping the distillation temperature below 35° C. The resulting solution contained 708,000 USP units oxytocin and 7,280 units vasopressin. The solution was then diluted with 0.25% acetic acid to the desired concentration of activity; Seitz-filtered and packaged in vials.

In the foregoing specification, this invention has been described in relation to certain specific embodiments thereof. However, it is not the intention of the inventors to limit the method described herein to the specific embodiments set forth. It will be apparent to those skilled in the art that many of the embodiments, as well as the specific details of the embodiments, can be varied widely without departing from the broad concept of the invention.

We claim:

1. In a method of preparing both ACTH and oxytocin from the same batch of pituitary glands, the steps of extracting whole pituitary tissue with a mixture of water and from 50 to 85% by volume of acetone at a pH of not more than 4 to obtain an extract containing both anterior and posterior pituitary hormones, separating said extract from the tissue residue, adjusting the actone concentration of the separated extract to within the range of from 86 to 95% by volume to precipitate, principally, ACTH and other anterior pituitary hormones and to obtain a supernatant liquid containing, principally, posterior pituitary hormones, separating said precipitate from said supernatant liquid, recovering the ACTH from the separated precipitate, subjecting the separater supernatant liquid to distillation under reduced pressure to reduce the acetone content thereof to less than 5% by volume and to obtain a substantially aqueous concentrate containing, principally, oxytocin and vasopressin, then mixing said aqueous concentrate with butanol at an acidic pH at which the solubility of the vasopressin is suppressed to obtain in the resulting mixture a butanol phase containing, principally, oxytocin and an aqueous phase containing, principally, vasopressin, separating the aqueous phase from the butanol phase, and recovering the oxytocin from the separated butanol phase.

2. In a method of recovering both ACTH and oxytocin from the same batch of pituitary glands, the steps of extracting whole pituitary tissue with a mixture of water and from 65 to 82% by volume of acetone at a pH of from 1 to 2 to obtain an extract containing both anterior and posterior pituitary hormones, separating said extract from the tissue residue, adjusting the acetone concentration of the separated extract to within the range of from 90 to 92% by volume to obtain a precipitate containing, principally, ACTH and other anterior pituitary hormones and a supernatant liquid containing, principally, posterior pituitary hormones, separating said precipitate from the supernatant liquid, recovering the ACTH from the separated precipitate, subjecting the separated supernatant liquid to distillation at reduced pressure to reduce the acetone content thereof to less than 5% by volume and to obtain a substantially aqueous concentrate containing, principally, oxytocin and vasopressin, mixing with said aqueous concentrate butanol at a pH of from 2 to 4.5 to obtain in the resulting mixture an aqueous phase containing, principally, vasopressin and a butanol phase containing, principally oxytocin, separating the butanol phase from the aqueous phase, and recovering the oxytocin from the separated butanol phase.

3. The method of claim 2 in which said whole pituitary tissue is whole hog pituitary tissue.

References Cited in the file of this patent

UNITED STATES PATENTS 2,362,993 Fleisher et al. _____ Nov. 21, 1944

FOREIGN PATENTS 334,898 Great Britain _____ Sept. 11, 1930

OTHER REFERENCES

Pincus: The Hormones, vol. 1, 1948, Acad. Press Inc., N.Y., p. 671.

J. Biol. Chem., vol. 187, No. 2, December 1950, pp. 719–731, p. 719 pert.

Neufeld: Proc. Soc. Exp. Biol. Med., October 1943, pp. 90–92.

U.S. Disp., 24th ed., 1947, Lippincott Co. Phila., pp. 897, 898, 899.

Vaichulis: Endocrinology, vol. 32, April 1943, pp. 361–366 (pp. 361 and 362 pert.).